June 11, 1957 — A. I. BECKER — 2,795,314
YIELDABLE FLIGHT EXTENSIONS FOR VERTICAL STALK FEEDING AUGERS
Filed June 5, 1953
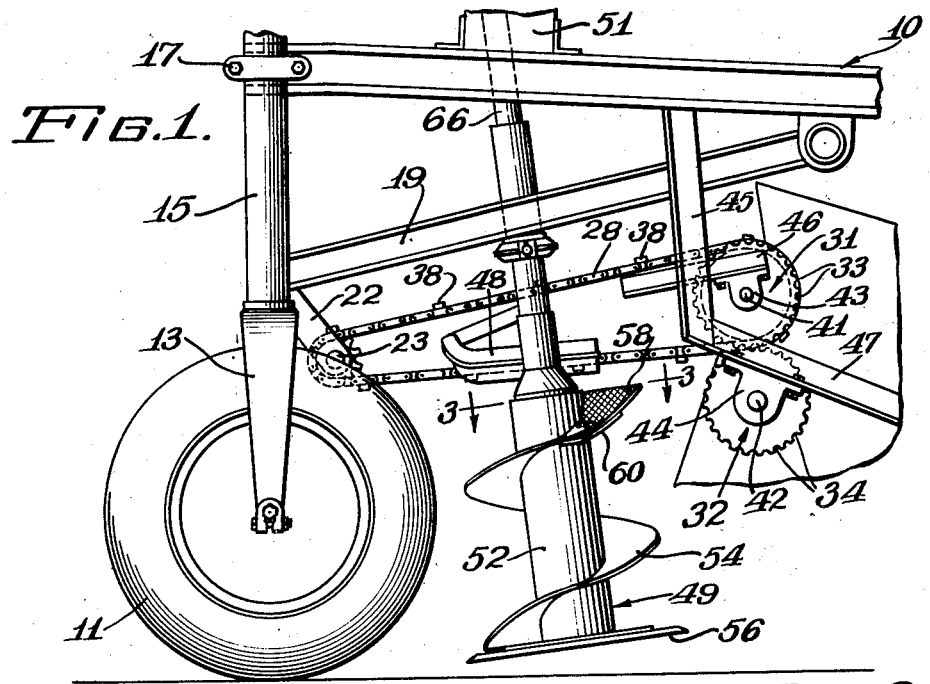
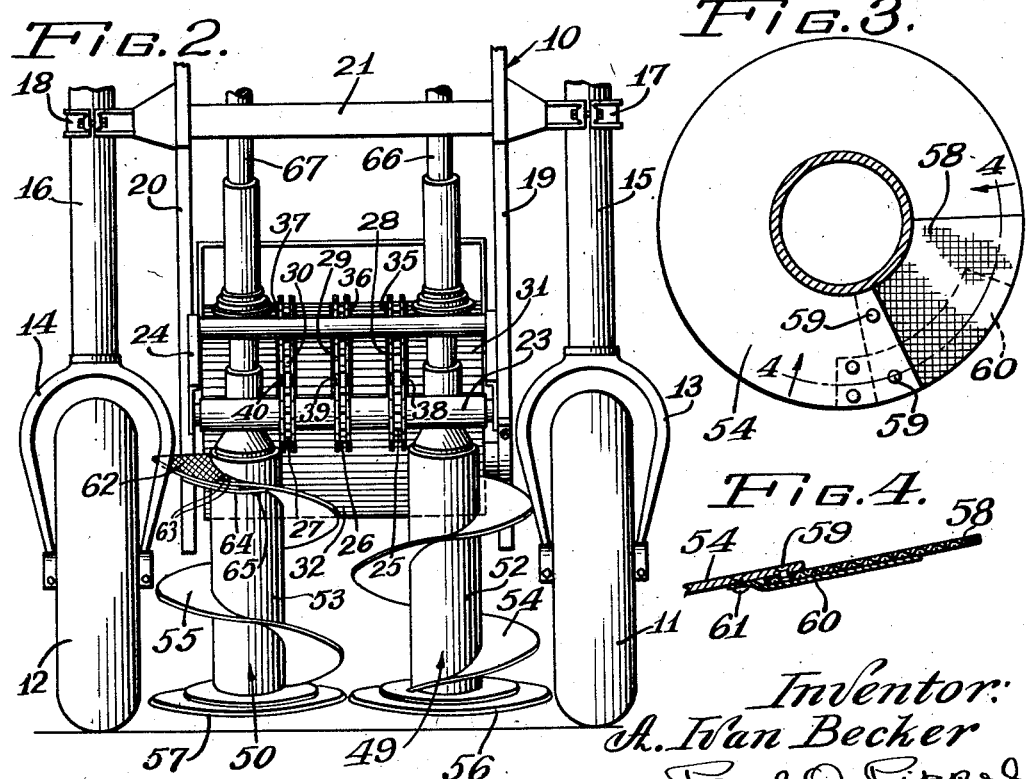
Inventor:
A. Ivan Becker United States Patent Office 2,795,314
Patented June 11, 1957

2,795,314

YIELDABLE FLIGHT EXTENSIONS FOR VERTICAL STALK FEEDING AUGERS

Abram Ivan Becker, Moline, Ill., assignor to International Harvester Company, a corporation of New Jersey Application June 5, 1953, Serial No. 359,703

4 Claims. (Cl. 198—104)

This invention relates to new and improved yieldable flight extensions for vertical stalk feeding augers.

Stalk harvesting machines and particularly cane harvesters have recently employed relatively vertically disposed side by side augers having cutting disks on the lower ends thereof for the purpose of cutting standing stalks at a position relatively near the ground line and the stalks thereafter being elevated between the side by side augers so that they lie in a relatively horizontal position for subsequent treatment by the harvesting machine. These stalk harvesting machines employ some moving surface means at the upper ends of the cooperative vertical feeding augers in order to cause the stalks being elevated by the augers to thereafter be moved longitudinally and preferably rearwardly into the stalk treating portion of the harvesting machine. Very often the transfer of the stalks from the vertical feeding augers to the rearwardly moving surface causes considerable damage to the stalks.

It is therefore an important object of this invention to provide means at the upper ends of vertically feeding augers to minimize the damage to stalks or other material being fed thereby during the transition of the stalks from the vertical augers to a horizontally moving conveyor surface.

Another important object of this invention is the provision of resilient flight extension means at the upper end of each of a pair of side by side vertically disposed stalk feeding augers.

Still another important object of this invention is to supply a relatively soft pliable extension for vertically feeding augers whereby the transfer of material from the vertically feeding augers to another conveyor means is accomplished without damage to the material being fed therethrough.

Another and still further important object of this invention is to employ a spring held canvas extension for the upper end of an auger conveyor.

Other and further important objects and advantages of this invention will become apparent from the disclosures in the following specification and accompanying drawings.

In the drawing:

Fig. 1 is a side elevational view of the forward part of a cane harvester employing the device of this invention;

Fig. 2 is a front elevational view of the device as shown in Fig. 1;

Fig. 3 is an enlarged sectional view taken on the line 3—3 of Fig. 1; and

Fig. 4 is a sectional view taken on the line 4—4 of Fig. 3.

As shown in the drawings the reference numeral 10 indicates generally a frame structure for the cane harvester of this invention. The forward end of the frame structure 10 is carried by spaced apart steerable wheels 11 and 12. Each of the wheels is mounted on a fork member 13 and 14 which is journally carried within supporting post members 15 and 16. Bracket clamp members 17 and 18 are adapted to join the wheel supporting posts 15 and 16 to the frame supporting structure 10. In addition to the main frame 10 there is also included an auxiliary frame structure including spaced apart arms 19 and 20 which are hingedly mounted on a cross tubular member 21 whereby the arms 19 and 20 may have relative angular movement with respect to the main frame 10. As best shown in Fig. 1 the auxiliary frame arm 19 has at its forward end a downwardly and rearwardly extending link arm 22, the lower end of which carries a cross shaft 23 which is journally supported in the lower end of a similar link arm 24 depending from the spaced apart auxiliary frame arm 20. A series of sprockets 25, 26 and 27 are mounted on the cross shaft 23 and provide the means for supporting the forward end of a relatively horizontally disposed conveyor adapted to receive the stalks from the vertically moving conveyor, not yet described, for the purpose of moving the stalks rearwardly into the crop treating portion of the cane harvesting machine. Each of the sprockets 25, 26 and 27 carries a chain 28, 29 and 30 which is mounted at its other end about the upper roller 31 of a pair of cooperative rollers the lower one being identified by the numeral 32. The feed rollers 31 and 32 are horizontally disposed and have their axes of rotation vertically spaced apart to provide for the feeding of stalks through the juncture between the feeding rolls. The outer cylindrical surfaces of the rollers 31 and 32 are scalloped or grooved as shown at 33 in the roll 31 and at 34 in the roll 32. Circumferential grooves 35, 36 and 37 are provided in the roller 31 to accommodate receiving the ends of the chains 28, 29 and 30 so that the surface of the chain is substantially coincident with the outer cylindrical surface of the roller 31. This of course permits the surface contact between the rollers 31 and 32 to continue for effective feeding of the stalks across the full width of the rollers 31 and 32. The chains 28, 29 and 30 all have regularly spaced apart, outwardly extending lugs 38, 39 and 40, respectively. The chain lugs provide an aggressive feeding action on the stalks to insure a positive feeding of the stalks in a rearward direction when the stalks arrive in a position adjacent the under side of the conveyor. The horizontal conveyor should be construed to mean the combination of the three lugged chains 28, 29 and 30.

The rollers 31 and 32 are mounted on cross shafts 41 and 42 which are in turn carried in pillow block bearings 43 and 44 respectively. These bearings 43 and 44 are fastened to frame members 45, 46 and 47 which are integrally fastened to the main frame 10. Chain guide members 48 are provided intermediate the upper and lower runs of the chains 28, 29 and 30 and maintain the lower run substantially extended in a horizontal plane thereby further insuring uninterrupted feeding of stalks through the cane harvester. The mounting and driving for the chain extending members 48 and the chains 28, 29 and 30 respectively are shown in greater detail in the copending application of Stuart D. Pool et al. Serial No. 319,312.

The means for cutting and gathering the cane stalks or other stalk crop is accomplished by a pair of side by side relatively vertically disposed auger members 49 and 50. The augers 49 and 50 are carried by the main frame 10 and the hingedly mounted auxiliary frame structure 19 and 20 to provide for a limited vertical movement thereof. A means for rotatably driving the augers is shown as a drive box 51 on top of the main frame 10. The gearing details within the box 51 have not been shown inasmuch as they do not directly bear on the present invention and are more fully shown in the copending application of Stuart D. Pool et al, having Serial No. 254,604, and now Patent No. 2,748,552. Each of the augers 49 and 50 includes a relatively large cylindrical core 52 and 53 the outer surface of which is covered by a rigid screw flight member 54 and 55. The bottoms of the augers are equipped with large diameter cutting disks 56 and 57 which substantially abut each other at their inner edges and cause a cutting of the standing cane stalks at their butt ends whereafter the butt ends of the stalks are raised vertically by reason of the intercalated screw 54 and 55 of the side by side augers until the stalks reach the upper ends of the augers at which time the rearwardly running horizontal conveyors take hold of the stalks and move them rearwardly into a juncture between the cooperative feeding rolls 31 and 32 to thereby deliver the harvested stalks to the crop treating elements of the cane harvester.

It is the passing of the stalks from the vertically feeding augers to the horizontally disposed conveyor which results in the most damage to the harvested cane stalks. It is therefore one of the primary objects of this invention to minimize the damage caused to the stalks during this transfer of the stalks from the vertical conveyor to the horizontal conveyor. The upper ends of the rigid screw flight 54 and 55 have resilient flight extensions so that the stalks when they are pushed upwardly against the horizontal conveyor may yield downwardly and thus reduce the damage to the stalk. The resilient extension includes a canvas member 58 which is riveted or otherwise fastened at 59 to the rigid flight member 54. As best shown in Figs. 3 and 4 a spring steel arm member 60 is riveted as shown at 61 to the rigid flight member 54 and thereupon extends upwardly around and beneath the canvas member 58 to support the canvas member in a substantially continuous screw flight formation with the rigid flight portion 54. Thus under all ordinary conditions the stalks being elevated by the augers will be raised the full height of the auger but in the event too great a quantity of stalks arrive against the under side of the horizontal conveyors at substantially the same time the stalks may then yield downwardly against the resilient canvas extension 58. As best shown in Fig. 2 a similar canvas extension 62 is mounted on the upper end of the rigid screw flight 55 of the auger 50 and is riveted thereto as shown at 63. A yieldable spring arm 64 is riveted at 65 to the rigid screw flight 55 and extends upwardly around and beneath the canvas extension 62 in the same manner as the leaf spring member 60. The cooperating yieldable extensions on the upper ends of the substantially vertically disposed feeding augers 49 and 50 contribute to the successful and uninterrupted feeding of cane stalks or other stalk crop material from vertical elevating means to horizontal conveying means without material damage thereto. The upper ends of the augers 49 and 50 are provided with shafts 66 and 67 to facilitate the rotatable driving of the augers from the driving means box 51 as shown in Fig. 1.

In the operation of the device of this invention the machine is adapted to traverse a field of standing cane. The cooperating disk cutters 56 and 57 skim over the ground line and cause a cutting of the cane stalks at their butt ends whereafter the stalks are raised vertically to a generally horizontal plane by the engaging augers 49 and 50 by the rigid screw flight thereof 54 and 55. When the stalks reach substantially the upper ends of the augers 49 and 50 they are then carried by the resilient extensions 58 and 62 of the screw flight at which time the stalks are pushed against the under side of the horizontal conveyor consisting of the three lugged chains 28, 29 and 30 thus causing a feeding of the stalks in a horizontal and rearward direction for subsequent treatment or delivery through the cane harvesting machine. It will thus be seen that the resilient canvas flight extensions for the cooperative side by side vertically feeding augers 49 and 50 perform the very important function of easing the stalks through the transition from vertical to horizontal movement and also provide for the successful movement of a plurality of stalks through the machine without damage to the stalks or impairment of the machine.

Numerous details of construction may be varied throughout a wide range without departing from the principles disclosed herein and I therefore do not propose limiting the patent granted hereon otherwise than as necessitated by the appended claims.

What is claimed is:

1. A stalk elevating and conveying mechanism comprising a pair of side by side relatively vertically disposed cooperative stalk lifting augers, generally horizontally disposed conveyor means located at the upper ends of said augers, said lifting augers each having a screw flight thereon, said screw flight being rigid, and said screw flight including downwardly yieldable resilient extension members forming continuations of the rigid screw flight at the upper ends thereof whereby transfer of the stalks from the elevating augers to the horizontally disposed conveyor means is made without damaging the stalks.

2. A device as set forth in claim 1 in which said resilient members include fabric extensions for said screw flight.

3. A stalk elevating and conveying mechanism comprising a pair of side by side relatively vertically disposed cooperative stalk lifting augers, generally horizontally disposed conveyor means located at the upper ends of said augers, said lifting augers having screw flight thereon, said screw flight including downwardly yieldable resilient members at the upper ends thereof whereby transfer of the stalks from the elevating augers to the horizontally disposed conveyor means is made without damaging the stalks, said resilient members including fabric extensions for said screw flight, and leaf spring members attached to said screw flight and extending beneath said fabric extensions whereby the fabric is yieldably held in the regular screw path of the screw flight.

4. An auger conveyor having a material discharge end, said auger conveyor comprising a core, a rigid spiral flight on said core, a resilient extension for said rigid spiral flight located at the discharge end of said auger conveyor, and said resilient extension being a fabric and backed by a leaf spring member having a shape conforming to a continuation of the rigid spiral flight.

References Cited in the file of this patent

UNITED STATES PATENTS

| 244,019 | Leas | July 5, 1881 |
| 292,550 | Fairly | Jan. 29, 1884 |
| 1,255,276 | Barnett et al. | Feb. 5, 1918 |
| 2,397,305 | Wheat | Mar. 26, 1946 |
| 2,648,943 | Shafer et al. | Aug. 18, 1953 |

FOREIGN PATENTS

| 588,299 | Great Britain | May 20, 1947 |